United States Patent [19]
Farrauto et al.

[11] 3,720,527

[45] March 13, 1973

[54] FAST SETTING HYDRAULIC CEMENTS FROM GLASS POWDERS

[75] Inventors: Robert J. Farrauto, Painted Post; William L. Haynes, Corning, both of N.Y.

[73] Assignee: Corning Glass Works, Corning, N.Y.

[22] Filed: April 15, 1971

[21] Appl. No.: 134,409

[52] U.S. Cl. .................................................... 106/85
[51] Int. Cl. ............................................... C04b 7/00
[58] Field of Search ........................... 106/74, 85, 52

[56] References Cited

UNITED STATES PATENTS

| | | |
|---|---|---|
| 2,077,258 | 4/1937 | Pitt et al. ................................ 106/74 |
| 2,204,357 | 6/1940 | Heckert ................................. 106/74 |
| 2,886,404 | 5/1959 | Teja ....................................... 106/74 |
| 2,964,415 | 12/1960 | Payne et al. ........................... 106/74 |
| 3,069,277 | 12/1962 | Teja ....................................... 106/74 |
| 3,498,802 | 3/1970 | Bickford et al. ....................... 106/74 |

*Primary Examiner*—James L. Poer
*Attorney*—Clarence R. Patty, Jr. and Clinton S. Janes, Jr.

[57] ABSTRACT

The present invention is concerned with the production of strong amorphous hydraulic cements from glass powders in the general composition field $R_2O$-$SiO_2$-$P_2O_5$, wherein $R_2O$ consists of $Na_2O$ and/or $K_2O$, which are relatively very fast setting, i.e., have setting times normally less than one hour. More specifically, the glass powders operable in this invention consists essentially, by weight on the oxide basis, of about 15–85% $R_2O$, 10–80% $SiO_2$, and 3–20% $P_2O_5$.

6 Claims, No Drawings

FAST SETTING HYDRAULIC CEMENTS FROM GLASS POWDERS

In U.S. Pat. application Ser. No. 134,410, filed concurrently herewith by us, is disclosed the manufacture of amorphous hydraulic cements from glass powders having compositions within the $R_2O-RO-SiO_2$ field, wherein $R_2O$ consists of $Na_2O$ and/or $K_2O$ and RO consists of at least one alkaline earth oxide selected from the group consisting of MgO, CO, SrO, and BaO. That application further discloses that the addition of a minor amount of the $H_2PO_4^-$ anion to the glass powders improves the compressive strength of the cement and frequently shortens the required setting time therefor.

In general terms, that application describes the production of hydraulic cements as contemplating three principal steps: First, comminuting a glass body of the proper composition to a powder which will pass a 140 mesh screen; Second, admixing water to the powder at temperatures between the freezing and boiling points of the water in water-to-powder weight ratios ranging between about 0.25–0.50; and, Third, holding the mixture within the prescribed temperature range for a sufficient time for curing to a hard, strong cement, this curing time commonly ranging from a period of several days up to as long as 60 days. The addition of the $H_2PO_4^-$ anion was observed in some instances to increase the reaction rate between the glass powder and water up to as much as five ties and, whereas this is certainly a significant improvement, it does not provide a truly quick-setting hydraulic cement.

For numerous applications, a hydraulic cement which would set in less than one hour and exhibit excellent adhesion to ceramics, glasses, and metals would be highly desirable. One example of such utility would involve the sealing of metal parts to the glass envelope of an electric light bulb where temperature stability would also be required. We have discovered that certain glass compositions within the $R_2O-SiO_2-P_2O_5$ field, when pulverized to powders passing a 140 mesh screen (<105 microns), will provide the basis for hydraulic cements which do, indeed, set to a hard body in less than one hour and will demonstrate relatively good temperature stability.

The method of the present invention is generally similar to that described in the above application. Hence, glass powders of the proper composition having diameters less than about 105 microns are blended with water at a temperature between the freezing point and boiling point thereof in water-to-powder weight ratios of about 0.25–0.50 and the mixture held within that temperature range for a sufficient time for curing. In its broadest terms, our invention contemplates glass powders consisting essentially, by weight on the oxide basis, of about 15–85% $Na_2O$ and/or $K_2O$, 10–80% $SiO_2$, and 3–20% $P_2O_5$. However, for hydraulic cements wherein the setting times are less than one hour, the glass compositions will generally be limited to between about 15–45% $Na_2O$ and/or $K_2O$, 35–80% $SiO_2$, and 5–20% $P_2O_5$.

Table I records compositions, expressed in weight percent on the oxide basis, of glasses which will form the hydraulic cements of the present invention. The ingredients constituting the glass-forming batches can be any materials, either oxides or other compounds, which, on being melted together, are transformed to the desired oxide compositions in the proper proportions. The batch ingredients were ballmilled together for about two hours to aid in obtaining a homogenous melt and then melted for about four hours in covered platinum crucibles in an electric furnace operating at 1600°C. The melt was passed through steel rollers to form thin ribbon (2 inch × 0.002 inch thick) which was subsequently cooled in the ambient atmosphere to room temperature. The possibility of devitrification of the glass was obviated through the very rapid cooling of the melt by cold rolling. Nevertheless, it has been shown that the presence of small amounts of devitrification in the glass, while certainly unwanted, does not deleteriously affect the properties of the resultant cement with respect to the strength. Also, the manner in which the glass ribbon is cooled to room temperature apparently has little effect upon the subsequent reactivity thereof with water, although annealed glass appeared to have a slightly slower set rate.

The glass ribbon was then crushed and ballmilled for about 20 hours to reduce the size of the particles sufficiently to pass through a 200 mesh screen (<74 microns). Because of the tendency toward hydroscopic behavior, the powder is placed in air tight containers until ready for use. The powder was blended with water in such amounts as to give a water-to-powder ratio between about 0.25–0.50. The evolution of a phosphorus-containing gas and large quantities of heat are readily discernable immediately after the blending step. The following equation represents the general progress of the curing reaction:

Glass Powder + $H_2O$ → Thick Paste → Hard Solid

Commonly, the slurries of glass powder and water were run into NALGENE test tubes, the tubes closed with rubber stoppers after the reaction has slackened, and the mixture allowed to react for various lengths of time at room temperature or at slightly elevated temperatures, i.e., less than about 100°C. To preclude freezing or boiling of the water, reaction temperatures between the freezing point and boiling point are generally desirable.

The compressive strengths of the hardened cements were shown to normally increase with the time allowed for reaction to proceed; the time required depending upon the particle size of the glass powder, the water-to-powder ratio employed, and the reaction temperature utilized. In general, smaller water-to-powder ratios, smaller glass particle sizes, and higher reaction temperatures will tend to increase the overall reaction rate.

Table I lists some of the glass compositions which, when comminuted to pass a 200 mesh screen, will react with water at temperatures between the freezing and boiling points thereof to produce a body exhibiting a rapid rate of set.

TABLE I

| | Percent | | | | | | | | | |
|---|---|---|---|---|---|---|---|---|---|---|
| | 1 | 2 | 3 | 4 | 5 | 6 | 7 | 8 | 9 | 10 |
| $SiO_2$ | 40 | 65 | 25 | 68 | 50 | 14 | 40 | 77 | 35 | 60 |
| $K_2O$ | | 30 | | 25 | 45 | 82.5 | 40 | | | |
| $P_2O_5$ | 5 | 5 | 15 | 7 | 5 | 3.5 | 20 | 8 | 20 | 15 |
| $Na_2O$ | 55 | | 60 | | | | | 15 | 45 | 25 |

Table II records the reaction times, in minutes, and temperatures employed with the glass powders of Table I to achieve a solid cement body. As was the case with the hydraulic cements of the above-described patent application, fillers such as sand, gravel, dirt, fly ash, etc., can be mixed with the glass powders prior to the reaction thereof with water at between the freezing and boiling points thereof in order to vary the setting time to specified requirements. Such addition should be limited to no more than about 30 percent by weight; otherwise, reactivity is seriously impaired and strength decreases. Several examples of such combinations are also reported in Table II.

TABLE II

| Sample | Set Time (min.) | Temperature (°C.) | Percent Filler (Sand) |
|---|---|---|---|
| 1 | <1 | 23–25 | 0 |
| 2 | <1 | 23–25 | 0 |
| 2 | 3 | 23–25 | 15 |
| 2 | 5 | 23–25 | 30 |
| 2 | >15 | 23–25 | 45 |
| 3 | 2 | 23–25 | 0 |
| 4 | 3 | 23–25 | 0 |
| 5 | 3 | 23–25 | 0 |
| 6 | <1 | 23–25 | 0 |
| 6 | 2 | 23–25 | 15 |
| 6 | 3 | 23–25 | 30 |
| 6 | >15 | 23–25 | 45 |
| 7 | 3 | 23–25 | 0 |
| 8 | 5 | 23–25 | 0 |
| 9 | 5 | 23–25 | 0 |
| 10 | 10 | 23–25 | 0 |

As was also observed with the hydraulic cements of the above-described patent application, differential thermal analyses of the instant cement point up two water peaks, one at about 150°C. and another between 400°–500°C. Experience has demonstrated that maintaining the cement samples in the vicinity of about 150°–200°C., after room temperature cure, will expel about 90 percent of the absorbed water. Exposure times of about 8–24 hours have commonly been found sufficient for this purpose. Table III records several examples of this practice and the tremendous effect this has in improving the chemical durability of the products when subjected to a weight loss test conducted in water at room temperature and in boiling water. Longer exposure times will remove still more water but the advantage gained is too slight to be commercially attractive.

TABLE III

| Sample | Curing Procedure | Durability in Water 25°C. | 100°C. |
|---|---|---|---|
| 2 | 25°C. for 1 day | 70% loss in weight after 3 hours | dissolves in 15 minutes |
| 2 | 25°C. for 1 day + 90°C. for 1 day | 0% loss after 3 hours | falls apart in 15 minutes |
| 2 | 25°C. for 1 day + 150°C. for 1 day | 0% loss after 3 hours | maintains shape but 10% dissolves after 3 hrs. |
| 2 | 25°C. for 1 day + 175°C. for 1 day | 0% loss after 3 hours | strong coherent body with no weight loss after 3 hours |

The mechanism of the reaction involved between water and the $R_2O$—$SiO_2$—$P_2O_5$ glass powders of the instant invention, while not completely understood, is believed to be similar to that described in the above-cited application, Ser. No. 134,410. Hence, the rate of development of initial strength in the body is directly proportional to the alkali content ($R_2O$) of the glass but the final strength of the body is higher for compositions having low alkali contents. Since the rate of dissolution of an alkali silicate glass in water is directly proportional to the alkali content thereof, it is believed apparent that the initial reaction is controlled by the rate of dissolution of the glass. And, inasmuch as the ultimate strength of the cement is likewise affected by the alkali content thereof, it is believed reasonable to assume that there is an inverse relationship holding between ultimate strength and alkali content which is due to increased linkage between the dissolved silica species, i.e., a polymerization process. In essence, then, the silica is believed to first dissolve and subsequently rearrange to a more dense solid silica structure.

This same type of mechanism appears to be applicable to the phosphate-containing glasses of the present invention with one important ramification. The large quantities of heat generated due to the reaction of water and phosphate give rise to a much more rapid reaction rate with the consequent development of strength more quickly. It is also conceivable that a phosphate polymer, i.e., $(HPO_4)_x$, the metaphosphate, may also form which can substantially alter the properties of the cement.

The particle size of the glass powder has been found to be of utmost importance in assuring operability of the invention. Hence, as has been observed above, the finer the particle size, the greater the reactivity of the glass with water. Thus, where the powder is much larger than is capable of passing through a 140 mesh screen, the reaction becomes considerably slower. Such particles could, of course, be employed as fillers, if desired, and used for applications demanding longer set times.

Finally, whereas the greatest reactivity and the fastest set are obtained where the glass powders consist essentially exclusively of the above-recited $R_2O$—$SiO_2$—$P_2O_5$ constituents, we have learned that various impurities not exceeding about 5 percent by weight total can be tolerated, The common effect of any such additions as MgO, CaO, SrO, BaO, CdO, ZnO, PbO, and $B_2O_3$ is to significantly lengthen the time required for setting up a hard body. Such additions may not seriously affect the final strength and may even improve the chemical durability of the product, but the great advantage of the present cements, viz., their very rapid set, will be sacrificed. Out preferred compositions, i.e., those compositions exhibiting the fastest setting times, while coupled with relatively good chemical durability, consist essentially, by weight on the oxide basis, of about 25–80% $R_2O$, wherein $R_2O$ consists of $Na_2O$ and/or $K_2O$, 5–20% $P_2O_5$, and 35–70% $SiO_2$.

In place of water an aqueous solution of alkali silicate solution can be mixed with the above-described glass powders, thereby also producing a fast setting cement. These cements have the unique property of being transparent and quite elastic, the elasticity being directly proportional to the amount of alkali silicate solution added. If an equivalent amount of alkali alone is first dissolved in water and then mixed with glass powder, no such transparent, elastic materials are produced. Furthermore, the use of low alkali silica, e.g., the colloidal silica, LUDOX, a material is produced with greatly reduced elasticity. These experiments indicate the necessity for using alkali silicate solutions. All of the compositions listed in Table I exhibit this behavior. Prolonged exposure to air results in undesirable drying which reduces transparency as well as resilience.

We claim:

1. A hydraulic cement composed of glass powders consisting essentially, by weight on the oxide basis, of about 15–85% $R_2O$, wherein $R_2O$ consists of $Na_2O$ and/or $K_2O$, 3–20% $P_2O_5$, and 10–80% $SiO_2$.

2. A hydraulic cement according to claim 1 wherein said glass powders consist essentially, by weight on the oxide basis, of about 25–80% $R_2O$, wherein $R_2O$ consists of $Na_2O$ and/or $H_2O$, 5–20% $P_2O_5$, and 35–70% $SiO_2$.

3. A method for making a body of hydraulic cement which comprises:
   a. melting a batch for a glass consisting essentially, by weight on the oxide basis, of about 15–85% $R_2O$, wherein $R_2O$ consists of $Na_2O$ and/or $K_2O$, 3–20% $P_2O_5$, and 10–80% $SiO_2$;
   b. cooling said melt to a glass body;
   c. reducing said glass body to a powder passing through a 140 mesh screen;
   d. admixing water to said glass powder at temperatures between the freezing and boiling points of the water in water-to-powder weight ratios ranging between about 0.25–0.50; and
   e. maintaining said mixture within said temperature range for a period of time sufficient to cure same to a solid body.

4. A method for making a body of hydraulic cement according to claim 3 wherein said batch consists essentially, by weight on the oxide basis, of about 25–80% $R_2O$, wherein $R_2O$ consists of $Na_2O$ and/or $K_2O$, 5–20% $P_2O_5$, and 35–70% $SiO_2$.

5. A method for making a body of hydraulic cement according to claim 3 wherein said solid body is heated to temperatures in the vicinity of 150°–200°C. for a period of time sufficient to expel absorbed water.

6. A method according to claim 5 wherein said time sufficient to expel absorbed water ranges between about 8–24 hours.

* * * * *